Feb. 7, 1933. C. J. VLARDI 1,896,532
PLOW GUIDING MEANS
Filed June 29, 1932
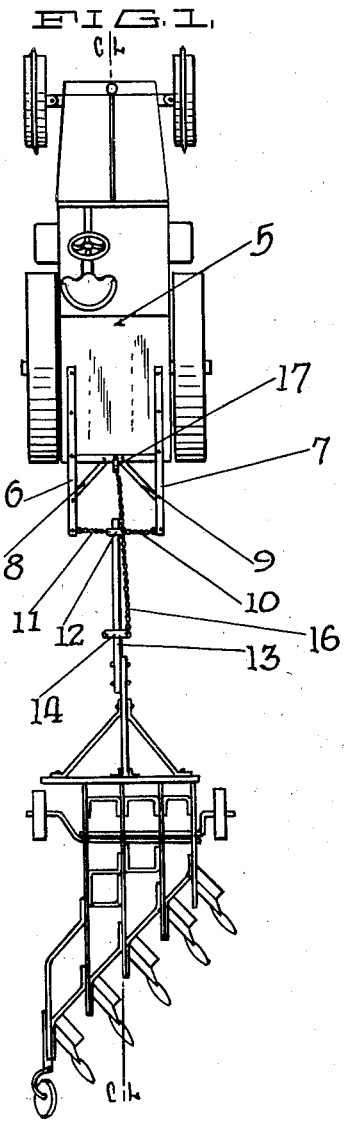
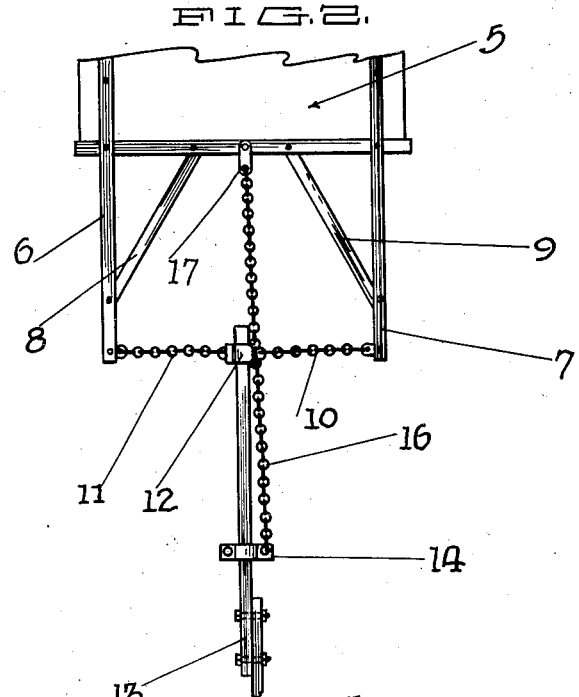
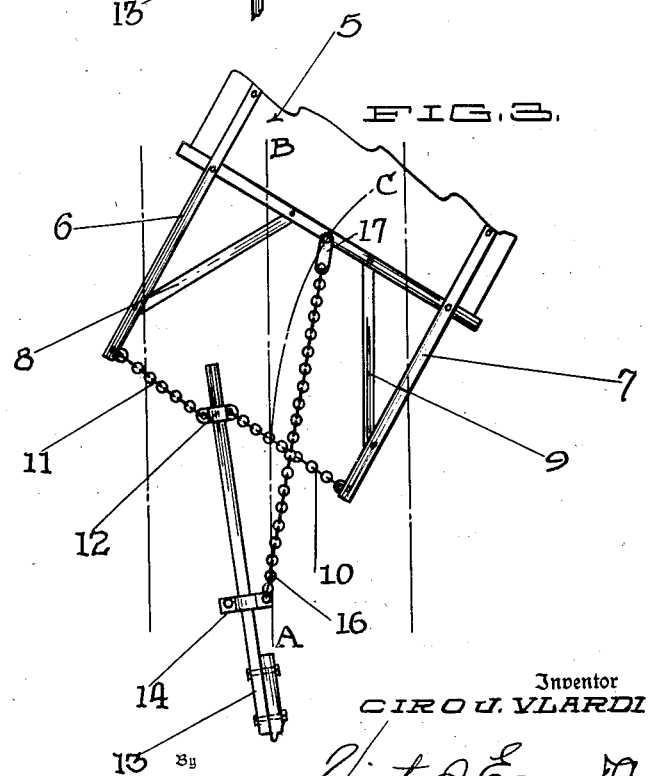
Inventor
CIRO J. VLARDI
By Victor J. Evans & Co.
Attorneys.

Patented Feb. 7, 1933                                                              1,896,532

UNITED STATES PATENT OFFICE

CIRO J. VLARDI, OF SACRAMENTO, CALIFORNIA

PLOW GUIDING MEANS

Application filed June 29, 1932. Serial No. 619,997.

This invention relates to improvements in plow guiding means, the principal object of which is to provide means whereby the plow may be caused to follow the tractor so that when the tractor turns a corner, the plow will be caused to follow instead of cutting the corner as is now the case.

Another object of this invention is to produce a device of this character which may be connected to any ordinary tractor.

A further object is to provide a device of this character which is simple in construction, neat in appearance and comparatively economical to manufacture, and therefore well within the purchase price of the average user.

Other objects and advantages will be apparent during the course of the following description.

In the accompanying drawing forming a part of this specification, and in which like numerals are employed to designate like parts throughout the same, Fig. 1 is a plan view illustrating my improved plow guiding mechanism in use connecting a plow to a tractor.

Fig. 2 is a plan view per se of my improved plow guiding mechanism as it appears when the tractor and plow are operating in a straight line, and Fig. 3 is a plan view per se of my improved plow guiding means illustrating the positions assumed by the operating parts when turning a corner in the field.

In plowing fields, the tractor follows the edge of the field until a corner is reached and in swinging around the corner the fact that the plow is flexibly connected to the tractor, causes the plow to cut the corner instead of following in the tracks of the tractor. I have therefore devised means whereby my device not only pulls the plow after the tractor but also provides means for guiding the forward end of the plow bar so as to cause it to follow the tractor instead of cutting the corner.

In the accompanying drawing wherein for the purpose of illustration is shown a preferred embodiment of my invention, the numeral 5 designates the rear portion of a tractor to which arms 6 and 7 are connected. These arms are braced as at 8 and 9, respectively and have secured there-between chains 10 and 11. These chains are connected to the slider 12 and to the arms 6 and 7. The slider moves on a guide bar 13. A clamp 14 is attached to the end of the implement such as a plow beam, which plow beam is also secured to the guide bar 13 and a chain 16 is connected between the clamp 14 and a link 17 secured upon the tractor.

The result of this construction is that as long as the tractor is moving in a straight direction as shown in Fig. 1, the pull upon the plow will cause the same to follow the path of the tractor.

The slippage of the slider 12 upon the guide bar 13 permits of slight variations in ground conditions and therefore permits the plow to adjust itself to the best working advantage. When the tractor starts to move away from the straight path, as for instance, in turning a corner, the chains 10 and 11 will cause the slider 12 to move out of the path of the center line of pull designated by the broken line A—B of Figure 2, and the chain 16 will follow the broken draft line A—C consequently while the pull would cause the plow to cut the corner as has been heretofore the practice, the fact that the slider 12 is guided to one side causes the plow to track behind the tractor as before mentioned, instead of cutting the corner.

It will thus be seen by this arrangement that no matter which way the tractor will move, the plow will at all times follow in its path.

It is to be understood that the form of my invention herewith shown and described is to be taken as a preferred example of the same and that various changes relative to the material, shape, size and arrangement of parts may be resorted to without departing from the spirit of the invention or the scope of the subjoined claim.

Having thus described my invention, I claim:—

In a device of the character described, the combination of a tractor having a pair of spaced rearwardly extending members attached thereto, a slider centrally positioned between the extremities of said members, a guide bar movable in said slider and adapted to have an implement secured thereto, a clamp secured to said guide bar at a point remote from said slider and a flexible coupling extending from said clamp to said tractor, the point of connection of said coupling being in alignment with said slider when said tractor is moved in a straight line.

In testimony whereof I affix my signature.

CIRO J. VILARDI.